UNITED STATES PATENT OFFICE.

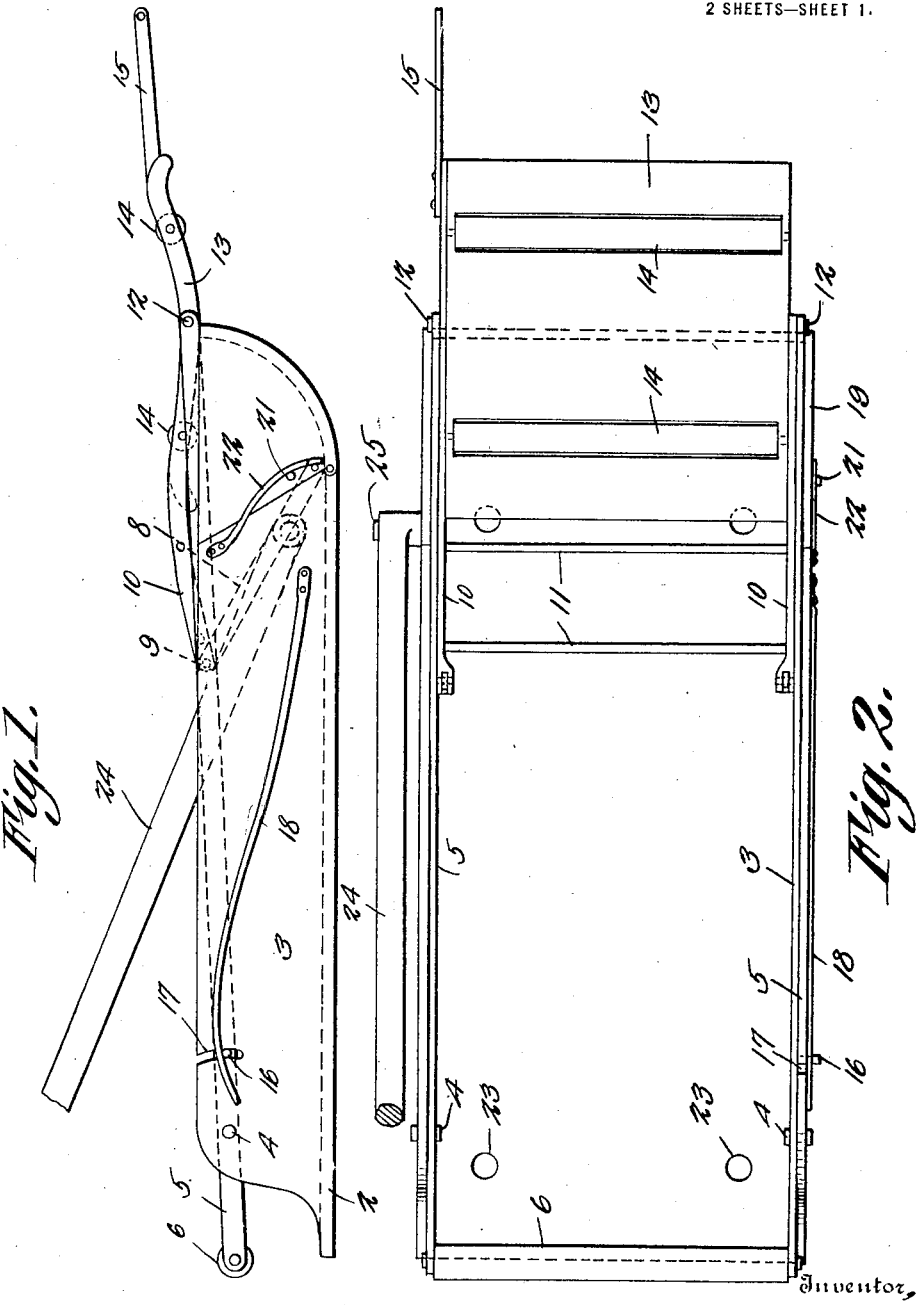

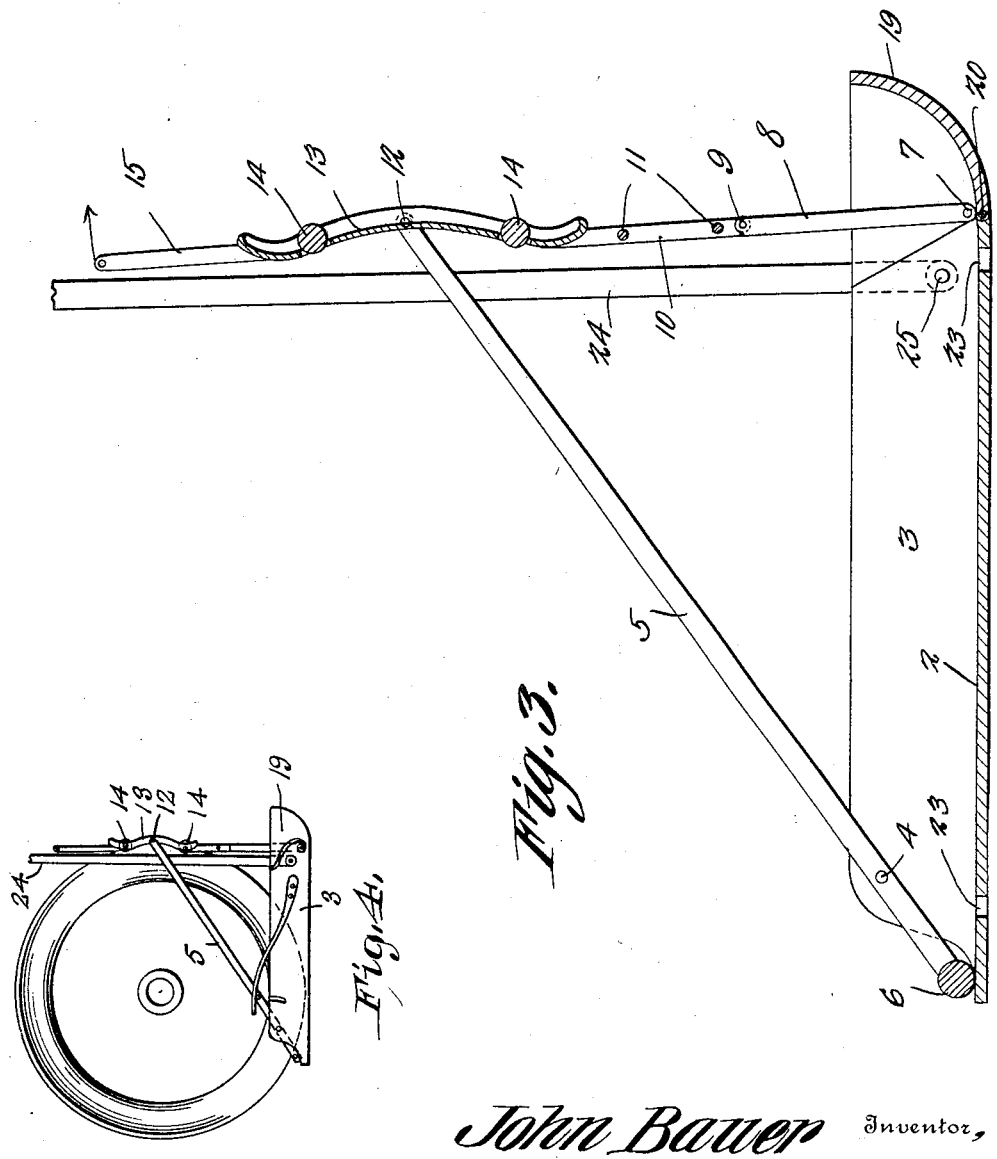

JOHN BAUER, OF DETROIT, MICHIGAN.

BRAKE.

1,330,833.  Specification of Letters Patent.  Patented Feb. 17, 1920.

Application filed March 21, 1919. Serial No. 284,005.

*To all whom it may concern:*

Be it known that I, JOHN BAUER, a citizen of the United States, residing at Detroit, in the county of Wayne and State of Michigan, have invented a new and useful Brake, of which the following is a specification.

This invention relates to improvements in brakes, the primary object of the invention being to provide an improved emergency brake which is capable of quick application and in the use of which the friction caused by the setting of the brake will be on the brakeshoe instead of upon the wheels as heretofore, whereby the burning of the rubber tires on the wheels of automobiles is entirely prevented.

A further object of the invention is the provision of a brake of the character set forth which adjusts itself automatically to the wheel upon contact therewith.

A further object of the invention is to provide a brake that may be used on soft ground or snow, or on "slick" rails, to afford a grip to the wheel, thereby preventing the spinning of the wheel.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Figure 1 is a side elevation of my improved brake, showing the same in closed position;

Fig. 2 is a plan view thereof; and

Fig. 3 is a sectional side view showing the brake in open or operative position.

Fig. 4 illustrates a side elevational view of a brake constructed in accordance with the present invention, a wheel being shown as applied thereto.

The same characters of reference designate the same parts in the different figures of the drawings.

In the embodiment herein illustrated, 2 designates a brakeshoe which is in the form of a rectangular plate having side walls 3 of suitable height. Pivoted at 4 to the side wall at each side of the brakeshoe, near the upper edge and adjacent to one of the side wall, is a strip or rod 5, the lower ends of which rods project toward the end of the brakeshoe and provide bearings for a roller 6 extending across the end of the brakeshoe. Pivoted at 7 to the opposite ends of the side walls 3, near the bottom thereof, are a pair of supports 8 extending upwardly and pivoted at 9 to a second pair of uprights 10, said uprights 10 being connected together by cross bars 11. The pivotal connection between the supports 8 and the uprights 10 is formed somewhat after the manner of a carpenter's rule joint, whereby such supports and uprights may assume a position at an angle to each other in one direction only. The upper ends of the members 10 are pivoted at 12 to the ends of the rods 5. A shield 13 is also pivoted by the same pivots 12 to the ends of the rods 5, the pivots being located centrally of said shield, as shown in Fig. 3, so that the same is permitted to freely swing on said pivots. The shield 13 is provided with a pair of crosswise extending rollers 14 adapted to project through slots formed in the front wall of the shield for a purpose to be hereinafter described. A lever 15 is secured to the upper end of one of the members 10 for manually operating these members to close the brake. It will be seen that on pulling the lever 15 in the direction of the arrow shown in Fig. 3 the members 8 and 10 will assume an angular position with relation to each other, thereby permitting the rods 5 to be folded down between the side walls of the brake. For holding the brake thus folded one of the rods 5 is provided with a laterally projecting pin 16 adapted to pass through a slot 17 formed in the side wall 3, and secured to the outer side of said side wall is a flat spring 18 the free end of which is adapted to bear on the upper side of said pin, as shown in Fig. 1, thereby to retain the structure in folded position. The brakeshoe is provided at one end thereof with a nose portion 19, which is pivoted at 20 to the side wall 3 and is provided with a laterally projecting pin 21 on which bears the free end of a spring 22 secured to the side wall 3, whereby said nose is normally maintained in the position shown in Figs. 1 and 3. The brakeshoe plate 2 may be provided with a number of openings 23 for permitting an extra bottom to be bolted on when required. For supporting the entire structure described from the vehicle on which it is to be used, I provide an arm 24, pivoted to the side wall 3, as shown at 25, and the opposite end of which arm may be pivoted to any suitable support carried by the vehicle.

The operation of the structure described is as follows: The brake is dropped by means of the arm 24, in its closed or folded position in front of the wheel, whereupon the wheel will strike the roller 6 and roll thereover, the weight of the vehicle on such roller causing the rods 5 to swing on their pivots 4, thereby throwing the supporting members 8 and 10 in upright position so as to maintain the brake open. The continued rotation of the wheel will cause the same to roll over the bottom of the brake until it engages the shield 13, whereupon the rolling of the wheel ceases, and if the momentum of the vehicle is such that it continues to run it will drag the entire brake along with it, whereby the friction between the brakeshoe and the ground will quickly bring the vehicle to a stop. It will be observed that by this construction not only is the wheel relieved of the wear caused by friction in the application of the ordinary form of brake, but, the bottom surface of the shoe being far greater than the curved portion of a wheel that would ordinarily engage the ground or pavement, the friction necessarily is very much greater, whereby the vehicle is brought to a stop very much sooner and in a shorter distance than possible with the use of the ordinary form of brake in which the wheel is locked against rotation. The shield 13 being pivoted at its center permits the same to adjust itself to the form of the wheel as it comes in contact therewith, and the rollers 14 reduce the friction between the wheel and the shield. The vehicle having been stopped, the lever 15 may now be pulled in the direction of the arrow in Fig. 3, whereupon the members 8 and 10 will be folded inwardly and the rods 5 dropped down between the side walls 3, and the vehicle may be driven over the shield 13 and the nose 19, the latter being swung on its pivot by the wheel of the vehicle, whereby the vehicle is freed from the brake. When the brake is used to afford a grip over soft ground or snow, or on a slick track, the lever 15 may be operated to close the brake as soon as the wheel has passed over the roller 6 and before the wheel engages the shield 13. It will thus be seen that I have provided a brake which is capable of quick and positive action in case of emergency, but one which will also be of great assistance to automobilists and others in getting over soft or slippery ground.

While I have described in detail the structure herein illustrated, it is to be understood that I do not thereby limit my invention to the precise features of construction shown, as I am aware that many mechanical changes may be made without departing from the spirit and scope of the invention as set forth in the appended claims.

Having thus described my invention, what I claim is:

1. A vehicle brake comprising a brake-shoe having upstanding side walls, foldable members pivoted to said side walls and carrying brake mechanism, said members being normally retained in folded position, and means carried by said side walls and adapted to contact with the wheel of a vehicle thereby to cause the unfolding of said members.

2. A vehicle brake comprising a brake-shoe having upstanding side walls, foldable members pivoted to said side walls and carrying brake mechanism, a spring secured to one of said side walls and adapted to retain said members normally in folded position, and means carried by said side walls and adapted to contact with the wheel of a vehicle thereby to cause the unfolding of said foldable members against the tension of said spring.

3. A vehicle brake comprising a brake-shoe having upstanding side walls, a pair of members pivoted to said side walls, a pair of members pivoted to said first members, both of said pairs of members being adapted to be folded between said side walls and normally retained in folded position, a brake shield pivoted to one pair of said members, and a pair of rods pivoted to said foldable members and to said side walls and carrying means adapted to contact with the wheel of a vehicle thereby to cause the unfolding of said foldable members.

4. A vehicle brake comprising a brake-shoe, having upstanding side walls, a pair of upright members pivoted to said side walls, a pair of members pivoted to said first members, brake means pivoted to said second pair of members, a pair of rods pivoted to the side walls and to said second pair of members, said pairs of members and rods being adapted to be folded between the side walls, a laterally extending pin carried by one of said rods, and a spring secured to one of the side walls and adapted to coöperate with said pin for holding the members normally in folded position.

5. A vehicle brake comprising a brake-shoe, having upstanding side walls, a pair of upright members pivoted to said side walls, a pair of members pivoted to said first members, brake means pivoted to said second pair of members, a pair of rods pivoted to the side walls and to said second pair of members, said pairs of members and rods being adapted to be folded between the side walls, a laterally extending pin carried by one of said rods, a spring secured to one of the side walls and adapted to coöperate with said pin for holding the members normally in folded position, and means carried by said rods and adapted to contact with the wheel of a vehicle thereby to cause the unfolding of all of said members against the tension of said spring.

6. A vehicle brake comprising a brakeshoe having a nose pivoted thereto, foldable brake mechanism carried thereby and retained normally in folded position, means carried by said brakeshoe adapted to contact with the wheel of a vehicle thereby to cause the unfolding of said mechanism, and manually operated means for folding said mechanism thereby to permit the passage of a vehicle wheel over said brake mechanism and said nose.

7. A vehicle brake comprising a brakeshoe, foldable brake mechanism carried thereby and retained normally in a folded position, means carried by said brakeshoe and extending beyond the rear of said brakeshoe, for contacting with the wheel of a vehicle, to cause the unfolding of said mechanism, and means for attaching said brake to a vehicle.

In testimony that I claim the foregoing as my own, I have hereto affixed my signature in the presence of two witnesses.

JOHN BAUER.

Witnesses:
 FRANK BAUER,
 E. BOWEN.